Patented Aug. 28, 1934

1,971,635

UNITED STATES PATENT OFFICE 1,971,635

PROCESS OF MANUFACTURING HARD SURFACE FLOOR COVERINGS AND MATERIAL THEREFOR

Julian T. Baldwin, West Chester, Pa.

No Drawing. Application November 24, 1930, Serial No. 497,950

20 Claims. (Cl. 91—68)

This invention relates to materials for plastic coating compositions, and to new products and the procedure for making them. It pertains particularly to dispersions of oil gels, especially highly oxidized oil gels, and their combinations with other materials suitable for use in preparing hard surfaced floor coverings.

When linseed oil or other drying oils dry they form a solid, elastic mass, which is called a gel. This gel is considered insoluble. Parts of it may be extracted with powerful solvents, the amount capable of being extracted depending on the degree of hardening or oxidation of the oil, highly oxidized oil gels having less extractible matter than those only partially oxidized.

Oxidized "scrim oil" used in linoleum manufacture has only a portion of its matter extractable with powerful solvents, and one of the control tests applied thereon consists in extracting the "scrim oil" in a refluxing apparatus for three days with toluol and with petroleum ether. For example, a good "scrim oil" containing 40% matter extractible with toluol and 20% extractible with petroleum ether, has 60% and 80% of its matter insoluble after this drastic treatment. This latter portion is referred to as the insoluble part, and has apparently not been dissolved.

The oxidized oil, however, if it could be made to completely dissolve, could be made into a solution or dispersion suitable as a vehicle for paints, and such paints would dry by evaporation largely, since the oil would be already oxidized. The oil or paint could then be first dried under scientifically controlled conditions and then applied to the surface to be painted or varnished.

It has been discovered that the problem of dissolving or dispersing the so-called insoluble oil gels can be solved by subjecting the gel to pressure in the presence of a dispersing agent or medium. The pressure may be mechanical or vapor pressure. The pressure, if mechanical, may be applied by passing a mixture of the gel and dispersing agent through a pair, or a plurality of pairs, of grinding rolls as they are known in the linoleum industry. A number of passes through the rolls are requisite for securing the thorough dispersion of the gel. The finest dispersions of the gel are obtained by the use of vapor pressure, although the gel may be subjected first to mechanical pressure, then to vapor pressure, then again to mechanical pressure so that the gel is subjected to mechanical pressure both before and after the vapor pressure treatment.

It is generally desirable to subject the solutions obtained by this process to further treatment. This consists of applying heat to the residue left after the evaporation or removal of the dispersing agents or solvents. The heat reaction becomes very rapid at 460° F. and the gel is transformed to an infusible, insoluble solid when oxidized linseed or china wood oils are used. The reaction is carried out at a lower temperature as 300° F. to avoid discoloration and decomposition. It is desirable in most cases to stop the reaction before the insoluble, infusible state is reached. This may be done by cutting with solvent at the proper time. This treatment very greatly increases the resistance of the oil to alkalies or aqueous liquids. The length of time and the temperature required to form the insoluble infusible form depend on the nature of the original oil. With highly oxidized linseed and china wood oils the time required to make this form is from five to fifteen minutes at 420° F. At lower temperatures the time increases. Reactive agents as phenol or reactive anti-oxidants up to 5% by weight of the oil may be incorporated with the oil before this hardening process. The addition of resins during or before the cooking reduces the viscosity of the gel solutions in most cases. Glycerine may be added to esterify the free acids.

Since this heat treatment eventually makes an insoluble, infusible form, it suggests the use of these dispersed oil gels as moulding plastics.

This dispersing process is set forth in detail in my copending application, Serial No. 497,947 of even date herewith in which is described the dispersion of oil gels in volatile solvents of organic nature such as ethyl alcohol—toluol mixtures, ethyl acetate, benzol, ether, acetone, petroleum, and carbon tetrachloride.

Other gels besides those which are secured primarily by oxidation may be dispersed by this treatment. Thus oils, including non-drying oils, gelled by sulfur or sulfur chloride may be dispersed by this treatment. China-wood oil gelled by ferric chloride or by heat treatment may be dispersed.

The present invention is concerned likewise with the dispersion of oil gels, particularly those of the oxidized oil variety, in the manner described hereinbefore and in my copending application Serial No. 497,947 of even date herewith, and with the further feature consisting in spraying or applying in any other suitable manner a mixture of a dispersion of oxidized oil gel; resin, or rubber or cellulose derivatives, or oils or plasticizers, or all these ingredients, or one of these latter ingredients combined with resin; cork; woodflour; mineral fillers; and pigments; upon a burlap or bituminous felt support, to form a hard surfaced floor covering.

In the ordinary process of manufacture of linoleum for floor coverings and the like, the oxidized oil is applied in the form of a linoleum cement, i. e., combined with rosin, which cements serves as a binder for the cork, woodflour, pigments, and other ingredients. No solvent or dispersing agent is employed, but the binder is applied in plastic form. It has been impossible to apply the oxidized oil in liquid form because no substance has been heretofore known which would satisfactorily dissolve or disperse the oxidized oil.

Since the discovery of the principle that oxidized oil gels can be made completely soluble or dispersable by mixing them with volatile dispersing agents and subjecting the mixture to pressure, it has been possible to apply this principle in the preparation of a liquid vehicle for linoleum ingredients, to thereby secure a more thorough and intimate intermingling thereof than heretofore attainable, and it is with this specific application of the principle that the present invention deals.

In the practice of the preferred form of this invention, a dispersion of oxidized oil gel is mixed with resin; rubber, or cellulose derivatives, or oils, or plasticizers; cork; woodflour; mineral fillers; and pigments; and after the addition of as much excess dispersing agent as is necessary to insure the mixture being in a thinly fluid or wet form suitable for spraying, the mixture is sprayed or otherwise applied upon a burlap or bituminous felt or other flexible support or backing to form, when dry, a hard surfaced floor covering. The sprays of the mixture, when spraying is employed, may contain different colored pigments, and be arranged to overlap so that color blending and shading is secured which can not be secured in the present day linoleum. The linoleum made in the above manner is subsequently calendered and cured in the usual manner.

A mixture similar to that described above, but containing no woodflour or cork, may be sprayed or printed onto bituminous saturated felt forming a layer much thicker than the layer of paint now used, since the material being already well dried, will harden in a much thicker layer than the regular oil paints.

Throughout the specification and claims, the expression "pure oil gels" is to be understood as meaning oil gels formed by initial drying processes from pure drying oils, and containing no other ingredients than the oxidized or modified oil itself, thereby excluding any such gels as those formed from linoleum scrap or like materials containing water soluble materials, coloring matter, or other impurities harmful in paints or varnishes.

As indicated above, the use of linoleum scrap materials is unsatisfactory in the present process and for numerous reasons outlined as follows:

(1) The cork or wood flour in linoleum scrap contains extractable matter such as tannic acid that, under treatment with heat and organic solvents, is transferred to the oxidized oil thereby lessening the tensile strength of the final product and darkening its color.

(2) On heating linoleum scrap and treating with solvent, reactions between oxy-acids or acids such as abietic acid and pigment and/or mineral filler material occur in which metallic abietates and metallic oxy-acid compounds are formed which harden and reduce the elasticity, adhesiveness and life of the product and also alter the color thereof.

(3) The presence of moisture in wood flour used in linoleum scrap causes the hydrolysis of fatty acid glycerides upon heating thereby forming acid matter which is inferior to the glycerides in plastic properties, waterproofness and permanence, and which reacts with pigments.

(4) By using linoleum scrap, a manufacturer is limited to a material which practically always contains rosin whereas in the present process any resin soluble in the solvents employed may be used.

(5) In using linoleum scrap no uniformity in the final product is assured, as for instance, the color is likely to be different for each batch of scrap used.

Also in the specification and claims the term "dispersion" is to be taken as including all liquid mixtures of carrier and secondary material wherein the two are so thoroughly intermingled as to make discrete particles of the secondary material invisible to the naked eye, thereby including true solutions as well as dispersions. The term "dispersing agent" is to be taken to mean a liquid carrier in the nature of either a solvent or a medium for holding colloid particles.

In place of oxidized oil gels, oxidized esters of unsaturated aliphatic acids derived from other sources may also be used, for the purpose of producing highly oxidized esters of the same type.

What I claim is:

1. The process of manufacturing a hard surfaced floor covering which comprises spraying a liquid mixture consisting of a dispersion of oxidized oil gel in an organic volatile solvent dispersing agent and other linoleum-forming ingredients upon a flexible backing the said gel being free from linoleum scrap materials previous to preparing the said dispersion and causing the liquid mixture to dry by evaporation of the dispersing agent.

2. The process of manufacturing a hard surfaced floor covering which comprises spraying a liquid mixture consisting of a dispersion of oxidized oil gel in an organic volatile solvent dispersing agent, resin, and other linoleum-forming ingredients upon a flexible backing the said gel being free from linoleum scrap materials previous to preparing the said dispersion and causing the liquid mixture to dry by evaporation of the dispersing agent.

3. The process of manufacturing a hard surfaced floor covering which comprises spraying a liquid mixture consisting of a dispersion of oxidized oil gel in an organic volatile solvent dispersing agent, resin, plasticizers, and other linoleum-forming ingredients upon a flexible backing the said gel being free from linoleum scrap materials previous to preparing the said dispersion and causing the liquid mixture to dry by evaporation of the dispersing agent.

4. The process of manufacturing a hard surfaced floor covering which comprises spraying a liquid mixture consisting of a dispersion of oxidized oil gel in an organic volatile solvent dispersing agent, resin, mineral fillers, plasticizers, and other linoleum-forming ingredients upon a flexible backing the said gel being free from linoleum scrap materials previous to preparing the said dispersion and causing the liquid mixture to dry by evaporation of the dispersing agent.

5. The process of applying a linoleum composition in liquid form which comprises adding to a dispersion consisting of oxidized oil gel and an organic volatile solvent dispersing agent, pigments, and other linoleum forming ingredients, the said gel being free from linoleum scrap materials previous to preparing the said dispersion and applying the resultant liquid-like mixture to a fabric backing.

6. The process of applying a linoleum composition in liquid form which comprises adding to a dispersion consisting of oxidized oil gel and an organic volatile solvent dispersing agent, pigments, resin, and other linoleum forming ingredients, the said gel being free from linoleum scrap materials previous to preparing the said dispersion and applying the resultant liquid-like mixture to a fabric backing.

7. The process of applying a linoleum composition in liquid form which comprises adding to a dispersion consisting of oxidized oil gel and an organic volatile solvent dispersing agent, pigments, resin, plasticizers, and other linoleum forming ingredients, the said gel being free from linoleum scrap materials previous to preparing the said dispersion and applying the resultant liquid-like mixture to a fabric backing.

8. The process of applying a linoleum composition in liquid form which comprises adding to a dispersion consisting of oxidized oil gel and an organic volatile solvent dispersing agent, pigments, resin, plasticizers, mineral fillers, other linoleum forming ingredients, the said gel being free from linoleum scrap materials previous to preparing the said dispersion and applying the resultant liquid-like mixture to a fabric backing.

9. The process of manufacturing a hard surfaced floor covering which comprises printing a liquid mixture consisting of a dispersion of oxidized oil gel in an organic volatile solvent dispersing agent and other linoleum-forming ingredients upon a flexible backing and causing the liquid mixture to dry by evaporation of the dispersing agent.

10. The process of manufacturing a hard surfaced floor covering which comprises printing a liquid mixture consisting of a dispersion of oxidized oil gel in an organic volatile solvent dispersing agent, resin, and other linoleum-forming ingredients upon a flexible backing and causing the liquid mixture to dry by evaporation of the dispersing agent.

11. The process of manufacturing a hard surfaced floor covering which comprises printing a liquid mixture consisting of a dispersion of oxidized oil gel in an organic volatile solvent dispersing agent, resin, plasticizers, and other linoleum-forming ingredients upon a flexible backing and causing the liquid mixture to dry by evaporation of the dispersing agent.

12. The process of manufacturing a hard surfaced floor covering which comprises printing a liquid mixture consisting of a dispersion of oxidized oil gel in an organic volatile solvent dispersing agent, resin, mineral fillers, plasticizers, and other linoleum-forming ingredients upon a flexible backing and causing the liquid mixture to dry by evaporation of the dispersing agent.

13. The process of applying a linoleum composition in liquid form which comprises adding to a dispersion consisting of oxidized oil gel in an organic volatile solvent dispersing agent, pigments, and other linoleum forming ingredients, and printing the resultant mixture on a fabric backing.

14. The process of manufacturing a hard surfaced floor covering which comprises printing a liquid mixture of a dispersion consisting of oxidized oil gel in an organic volatile solvent dispersing agent and other linoleum-forming ingredients upon a bituminous saturated felt backing and causing the liquid mixture to dry by evaporation of the dispersing agent.

15. The process of manufacturing a hard surfaced floor covering which comprises printing a liquid mixture consisting of a dispersion of oxidized oil gel in an organic volatile solvent dispersing agent, resin, and other linoleum-forming ingredients upon a bituminous saturated felt backing and causing the liquid mixture to dry by evaporation of the dispersing agent.

16. The process of manufacturing a hard surfaced floor covering which comprises applying a liquid mixture consisting of a dispersion of oxidized oil gel in an organic volatile solvent dispersing agent and other linoleum-forming ingredients upon a flexible backing, the said gel being free from linoleum scrap materials previous to preparing the said dispersion and causing the liquid mixture to dry by subjecting it to a baking action at from 140° F. to 180° F.

17. The process of manufacturing a hard surfaced floor covering which comprises spraying a liquid mixture consisting of a dispersion of oil gel in an organic volatile solvent dispersing agent and other linoleum forming ingredients upon a flexible backing, the said gel being free from linoleum scrap materials previous to preparing the said dispersion and causing the liquid mixture to dry by evaporation of the dispersing agent.

18. The process of applying a linoleum composition in liquid form which comprises adding to a dispersion consisting of oil gel in an organic volatile solvent dispersing agent, pigments, resin, plasticizers, and other linoleum forming ingredients, the said gel being free from linoleum scrap materials previous to preparing the said dispersion and applying the resultant mixture to a fabric backing.

19. The process of applying a linoleum composition in liquid form, which process comprises adding to a dispersion consisting of an oxidized gel of a glyceride of an unsaturated aliphatic acid in an organic volatile solvent dispersing agent, pigments and other linoleum-forming ingredients, the said gel being free from linoleum scrap materials previous to preparing the said dispersion and applying the resulting mixture to a fabric backing.

20. A process of manufacturing flexible sheet material which comprises adding to a dispersion consisting of oxidized oil gel in an organic volatile solvent dispersing agent, pigments, mineral fillers, and resin, the said gel being free from linoleum scrap materials previous to preparing the said dispersion, and applying the resultant liquid-like mixture to a flexible support.

JULIAN T. BALDWIN.